Oct. 2, 1951   G. C. PEARCE   2,569,775
DOMESTIC APPLIANCE

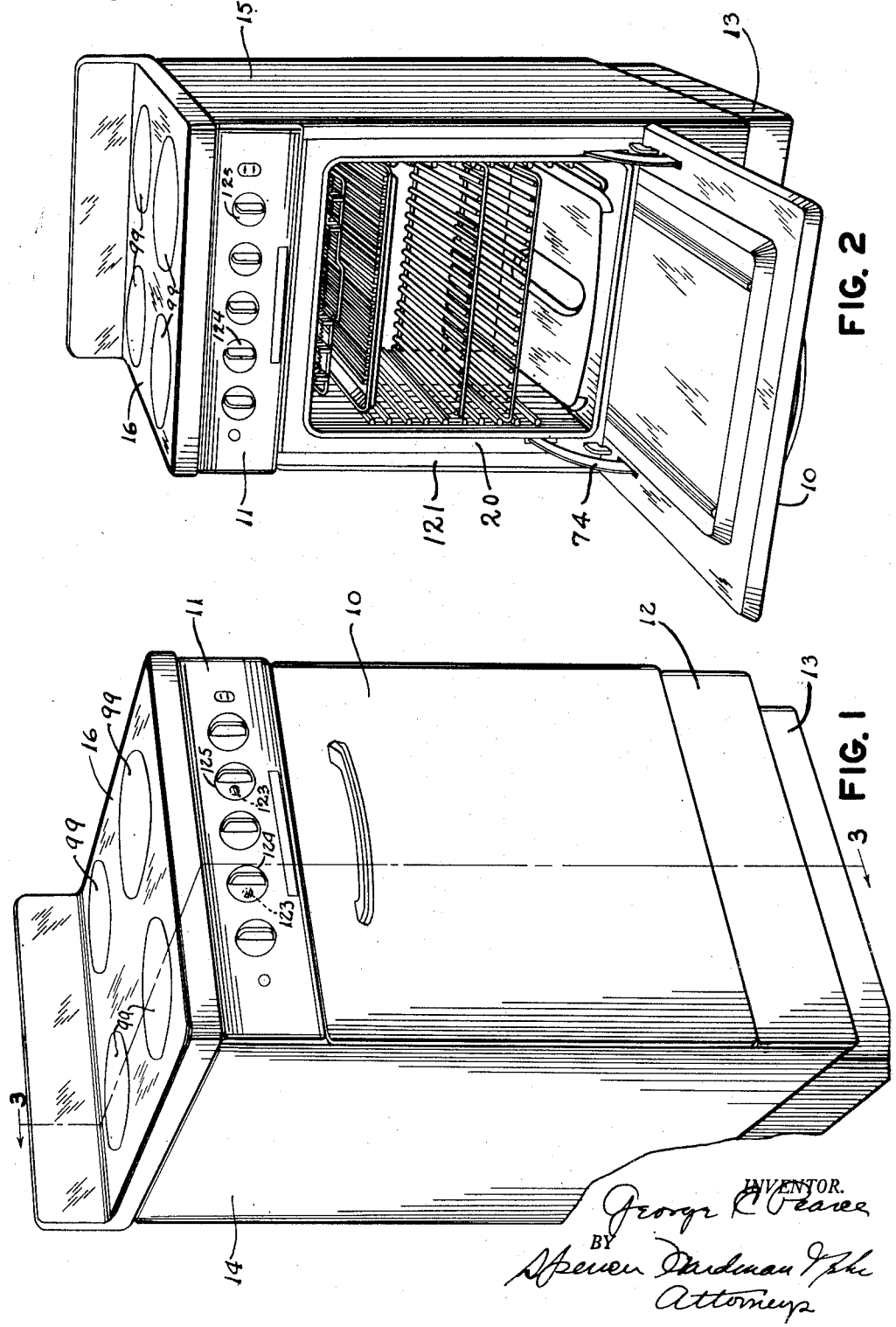

Filed Sept. 18, 1946   13 Sheets-Sheet 5

Oct. 2, 1951 G. C. PEARCE 2,569,775
DOMESTIC APPLIANCE

Filed Sept. 18, 1946 13 Sheets-Sheet 6

Oct. 2, 1951   G. C. PEARCE   2,569,775
DOMESTIC APPLIANCE
Filed Sept. 18, 1946   13 Sheets-Sheet 7

Oct. 2, 1951  G. C. PEARCE  2,569,775
DOMESTIC APPLIANCE
Filed Sept. 18, 1946  13 Sheets-Sheet 9

INVENTOR.
George C. Pearce
BY
Spencer Hardman Nelson
Attorneys

Oct. 2, 1951 G. C. PEARCE 2,569,775
DOMESTIC APPLIANCE
Filed Sept. 18, 1946 13 Sheets-Sheet 10

INVENTOR.
George C. Pearce
BY
Spencer Hardman & ...
Attorneys

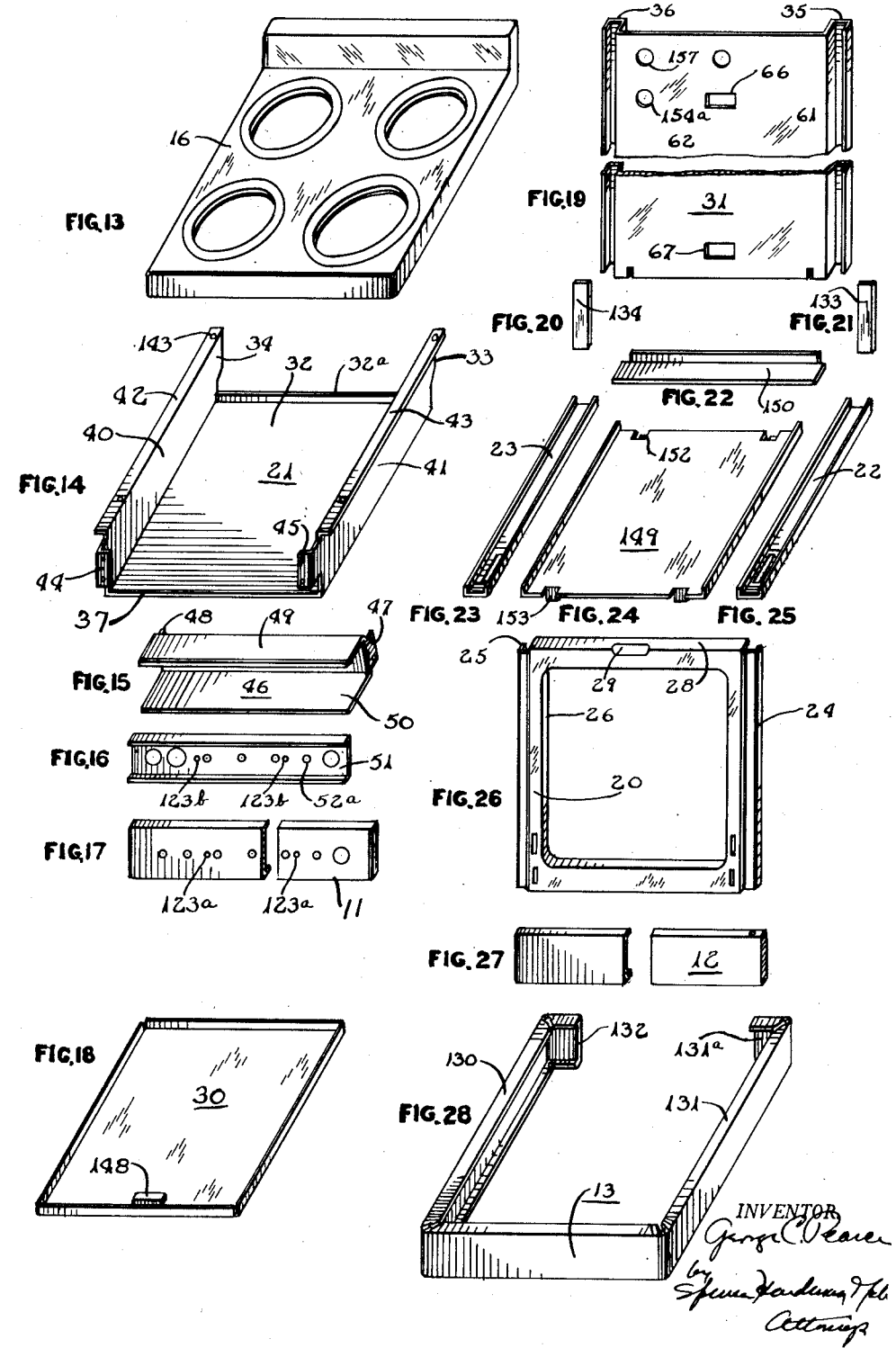

Oct. 2, 1951  G. C. PEARCE  2,569,775
DOMESTIC APPLIANCE
Filed Sept. 18, 1946  13 Sheets-Sheet 12

INVENTOR.
George C Pearce
BY
Spencer Hardman & Tyler
Attorneys

Oct. 2, 1951        G. C. PEARCE        2,569,775

DOMESTIC APPLIANCE

Filed Sept. 18, 1946        13 Sheets-Sheet 13

Patented Oct. 2, 1951

2,569,775

UNITED STATES PATENT OFFICE 2,569,775

DOMESTIC APPLIANCE

George C. Pearce, Dayton, Ohio, assignor to General Motors Corporation, Dayton, Ohio, a corporation of Delaware Application September 18, 1946, Serial No. 697,622

3 Claims. (Cl. 219—35)

This invention relates to domestic appliances, and more particularly to electric ranges.

This application is a continuation-in-part of my copending application Serial No. 613,982, filed September 1, 1945 for Domestic Appliance, and Serial No. 616,361, filed September 14, 1945 now Patent No. 2,550,161 for Domestic Appliance.

An object of this invention is to provide a range having a box-like frame to which side panels, a cooking top, an oven liner, an oven door, and other parts may be attached to form the completed range.

Another object of this invention is to provide a box-like frame upon which all of the wiring of the range may be mounted before the side panels and other finishing parts of the range are attached thereto, the frame being sufficiently small and light in construction to permit the easy handling and moving about, while the wiring is being mounted on the frame.

Further objects and advantages of the present invention will be apparent from the following description, reference being had to the accompanying drawings, wherein a preferred form of the present invention is clearly shown.

In the drawings:

Fig. 1 is a front view of the range, in perspective, with the oven door closed;

Fig. 2 is a view, in perspective, with the door open to reveal the interior of the oven;

Fig. 13 is a view in perspective of the top panel of the range;

Fig. 14 is a view of the top of the frame;

Fig. 15 is a view of the front of the top of the frame;

Fig. 16 is a view of the switch bar;

Fig. 17 is a view of the front switch panel;

Fig. 18 is a view of the drip pan;

Fig. 19 is a view of the rear panel of the frame;

Figs. 20 and 21 are views of the rear connecting plates;

Fig. 22 is a view of an angle member in the rear of the box-like frame;

Figs. 23, 24 and 25 are views of the bottom members of the box-like frame;

Fig. 26 is a view of the front member of the box-like frame;

Fig. 27 is a view of the front lower panel of the range;

Fig. 28 is a view of the supporting base for the frame;

Figure 7:
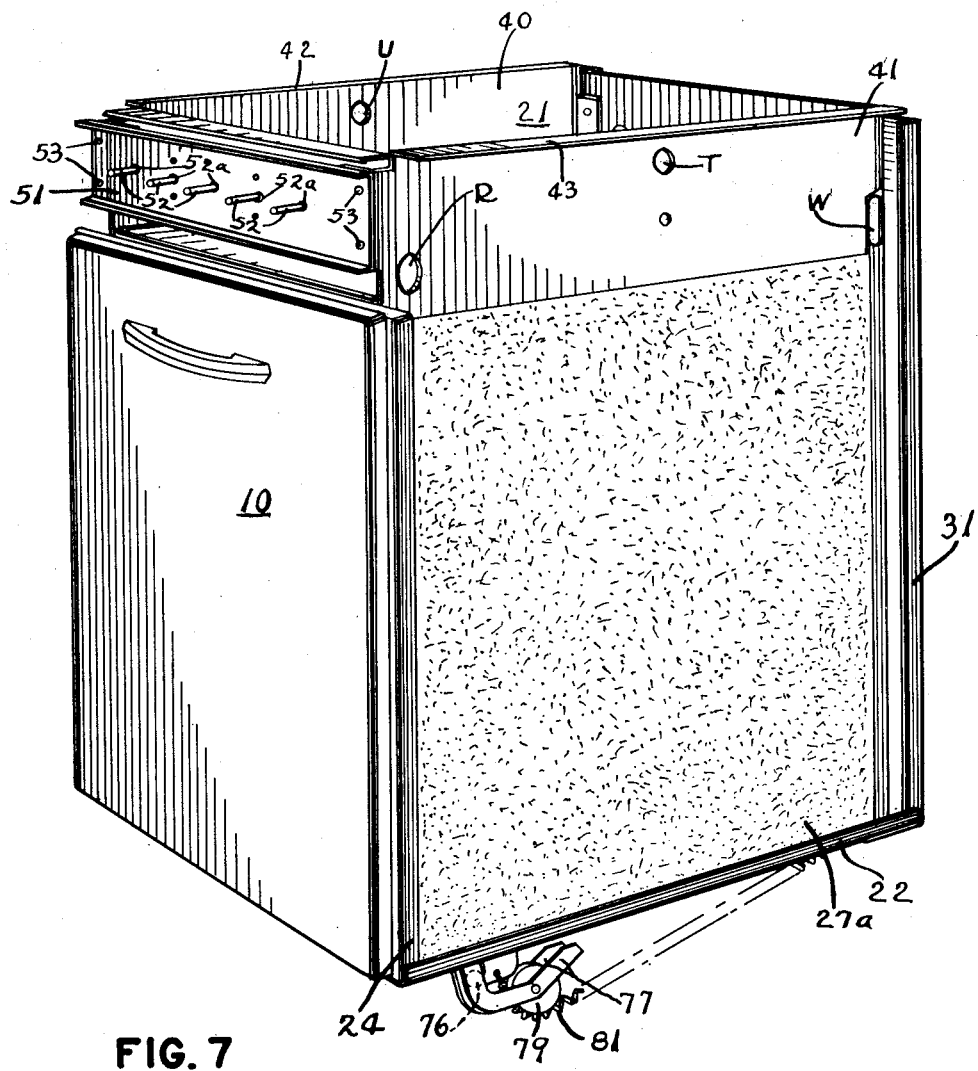
Fig. 7 is a view, in perspective, of the box-like frame, with the oven, insulation, and oven door added.
Figure 8:
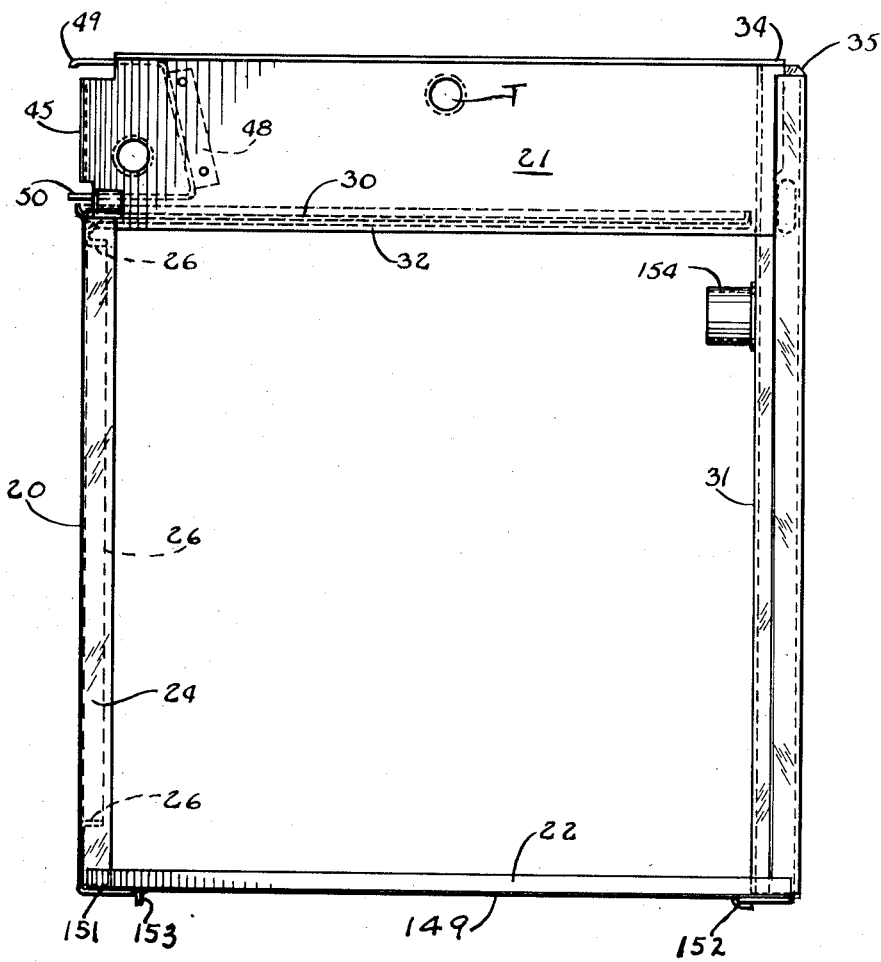
Fig. 8 is a vertical side view of the box-like frame.
Figure 10:
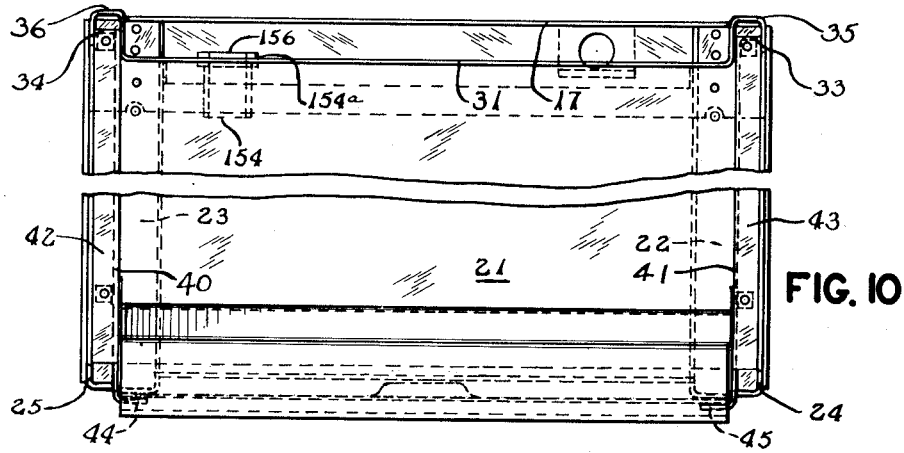
Fig. 10 is a top view of the frame, with portions broken away.
Figure 9:
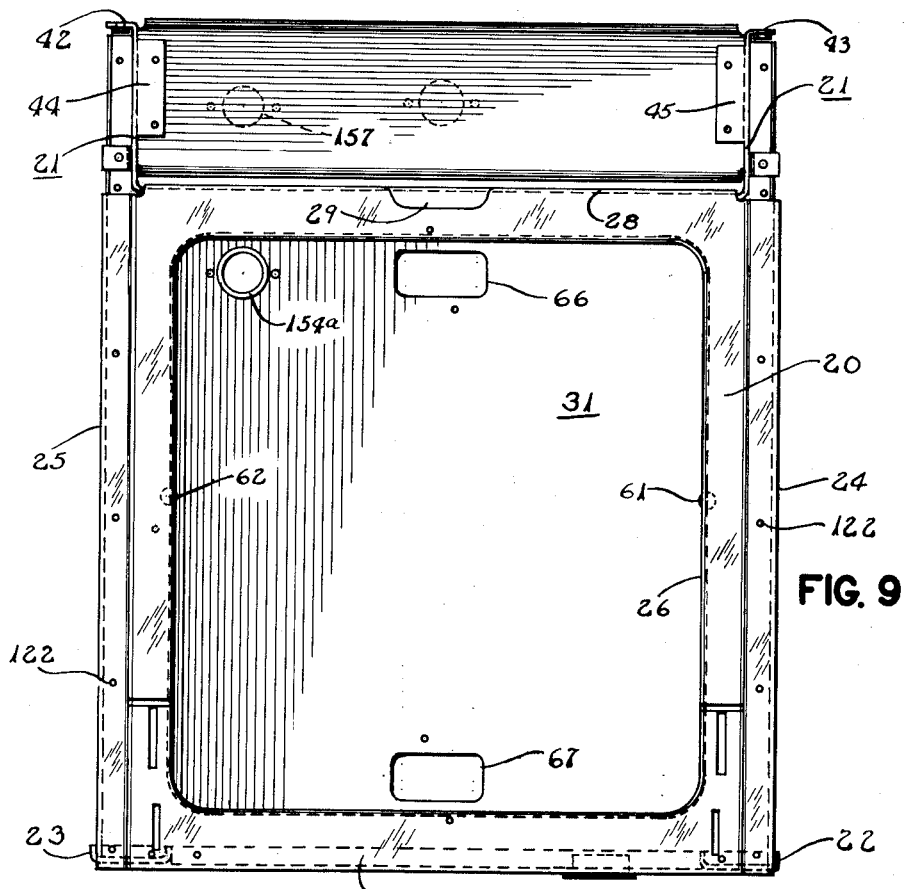
Fig. 9 is a front vertical view of the box-like frame.
Figure 11:
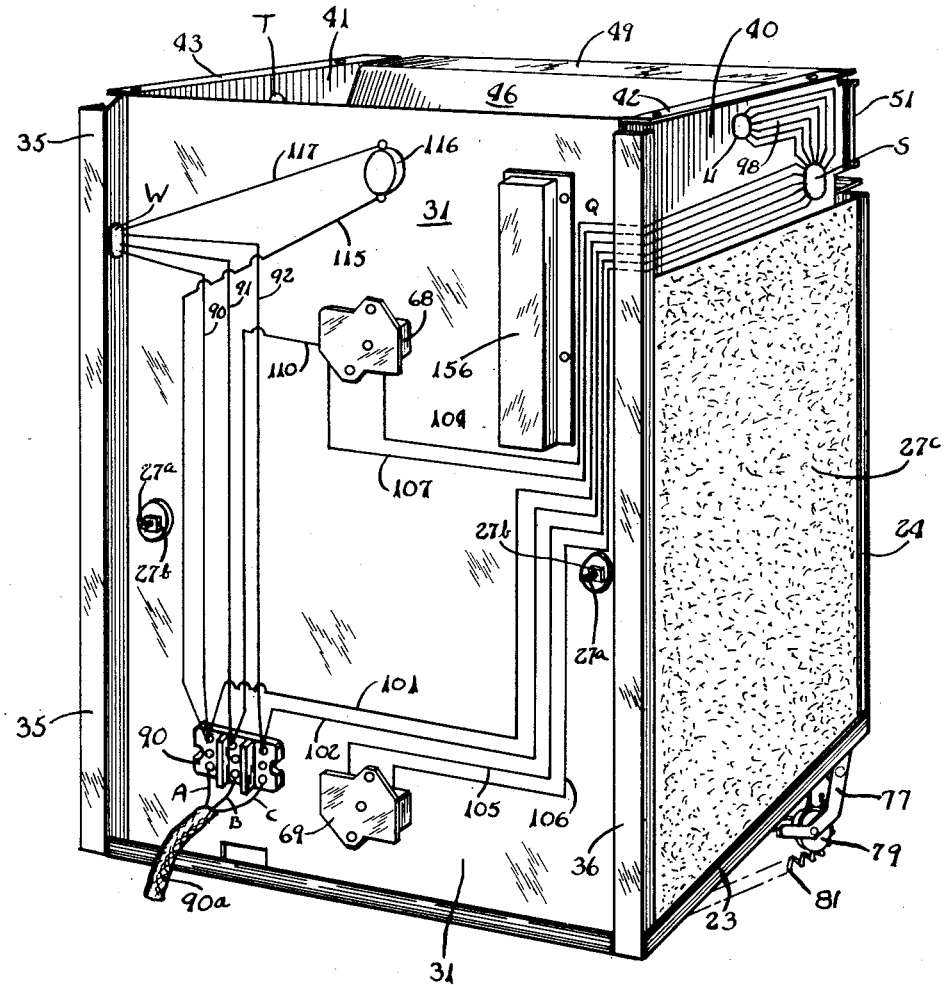
Fig. 11 is a rear view of the structure shown in Fig. 7, with certain portions of the wiring diagrammatically indicated.
Figure 12:
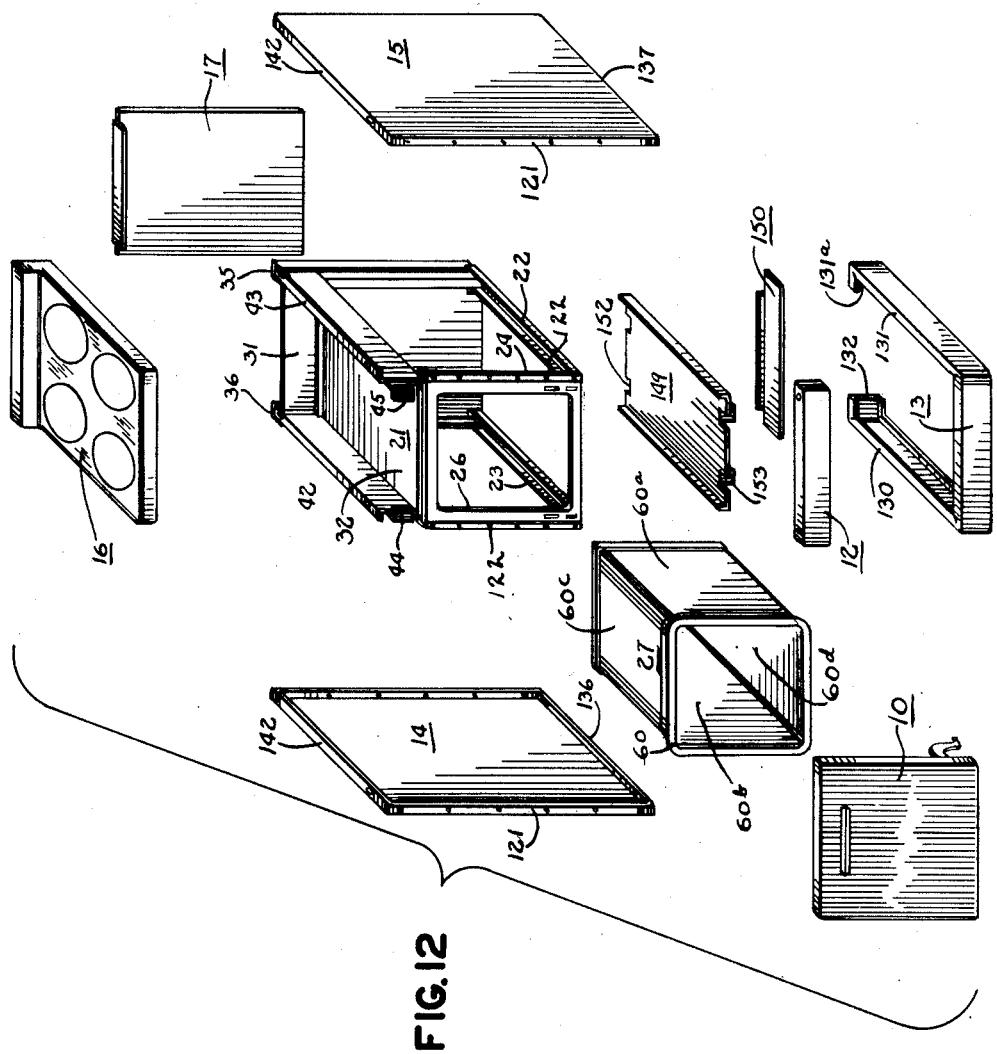
Fig. 12 is an exploded view of the structural parts of the range.

A range, according to my invention, is shown in its completed form in Figs. 1 through 6. In its initial stages of construction, a skeleton box-like frame is constructed as shown in Figs. 8, 9 and 10, and in a later stage as shown in Figs. 7 and 11. This box-like frame is sufficiently small to allow the easy handling for placing the wiring thereon, and also for installing the oven liner, insulation, front door and other parts, before the side panels and base are added. The box-like frame, oven liner, side panels, oven door, top panel and base, which go into making the rigid part of the range, are shown in Fig. 12, in an exploded view. The parts are exploded by moving them in a general direction away from the center of Fig. 12.

The members which are used to construct the box-like frame, and switch board panel are shown in Figs. 13 through 26.

Figure 32:
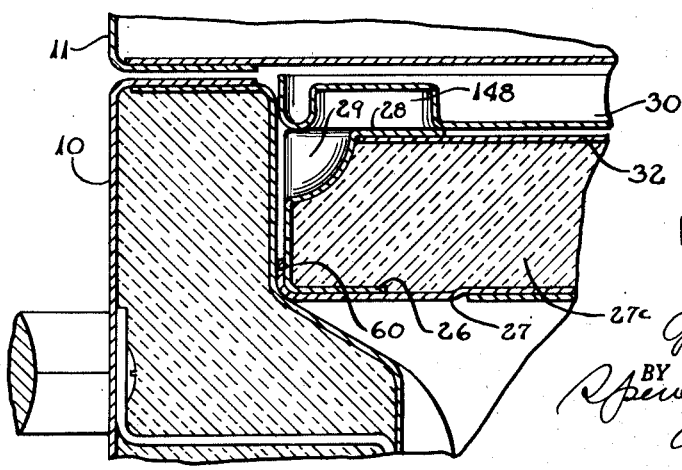
Fig. 32 is an enlarged vertical cross-section of a portion of the top of the oven door and drip pan.
Figure 31:
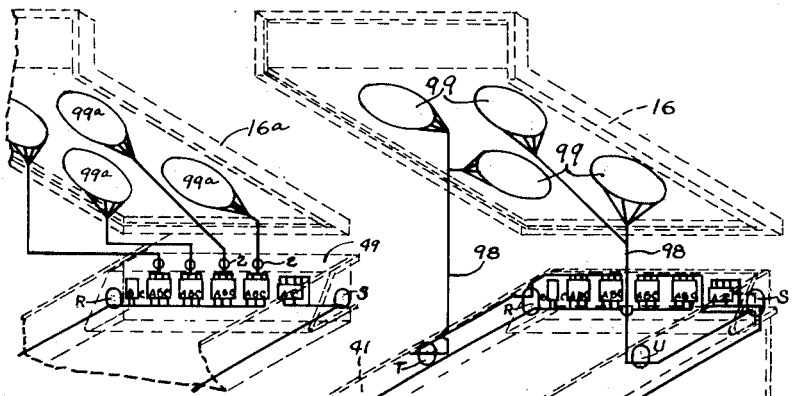
Fig. 31 is a view similar to a portion of Fig. 29, but showing a modification.
Figure 29:
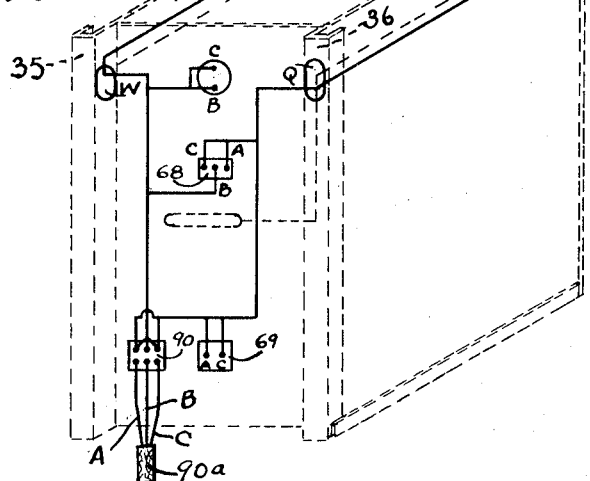
Fig. 29 is a view, in perspective, showing the cable connections for the wiring diagram.

The box-like frame construction permits the placing of prefabricated cables on the frame, which are mounted as indicated in Fig. 29, or its modification in Fig. 31. These cables produce the electrical connections shown in Fig. 30. The door counterbalancing means are shown in Figs. 33 through 36. The upper end of the door and its adjacent details are shown in Fig. 32.

Figure 4:
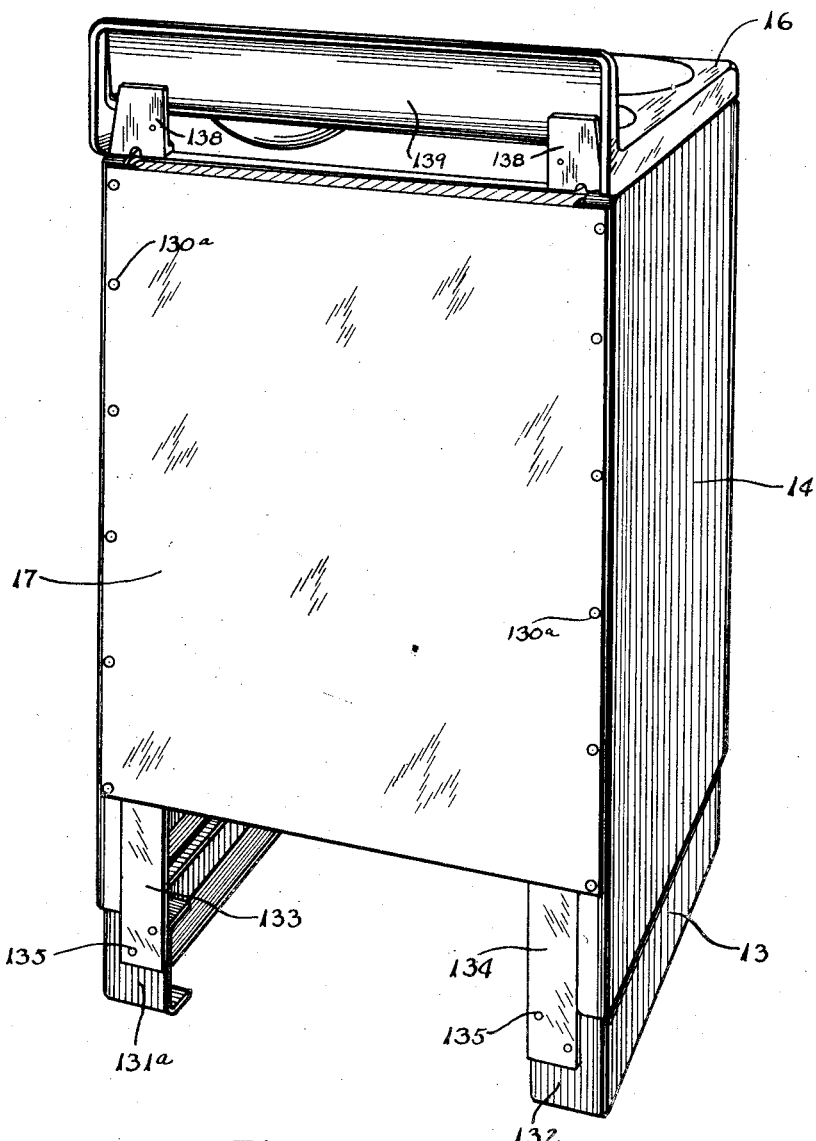
Fig. 4 is a rear view of the range.
Figure 5:
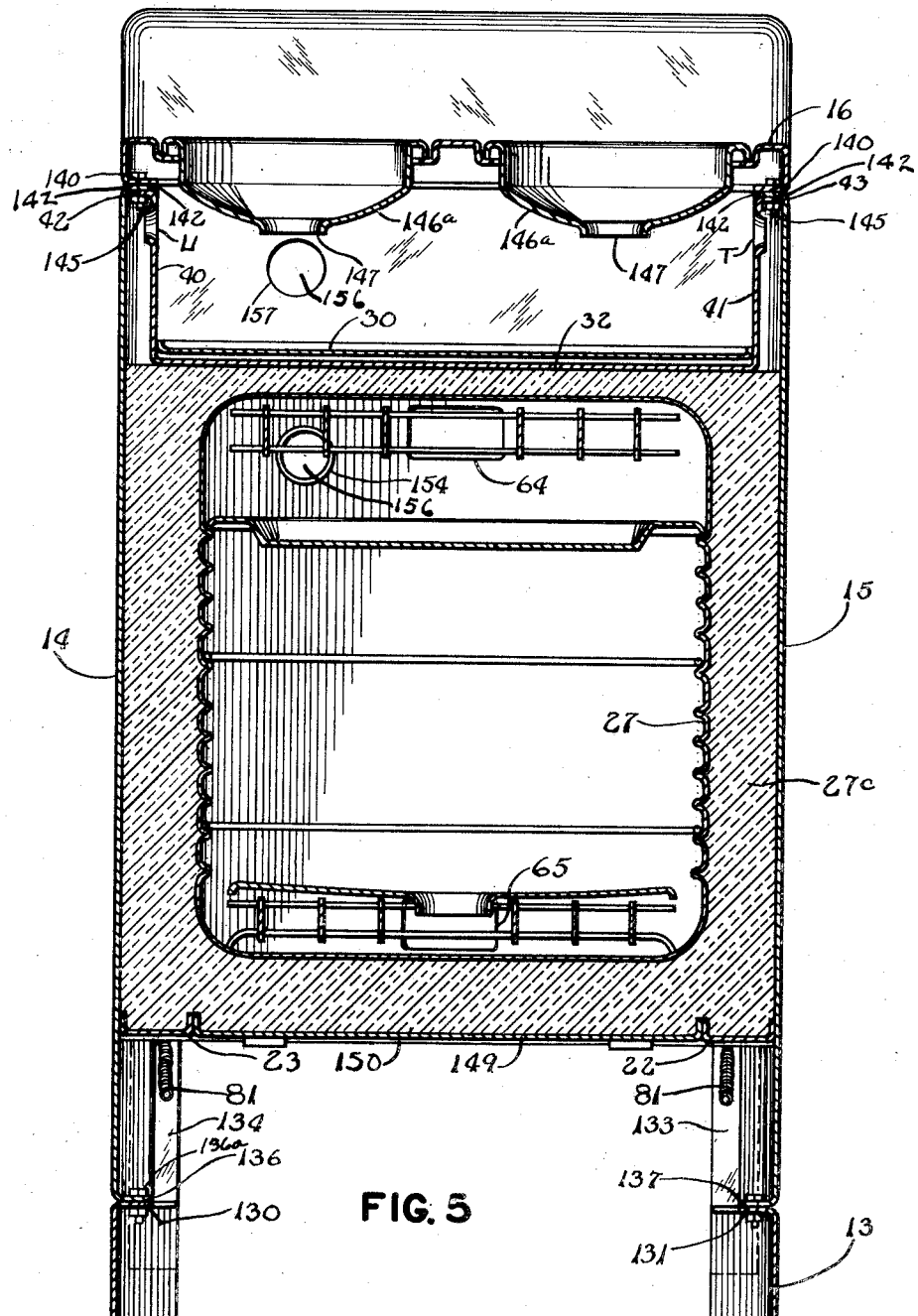
Fig. 5 is a vertical cross-section taken along the line 5—5 of Fig. 3.
Figure 6:
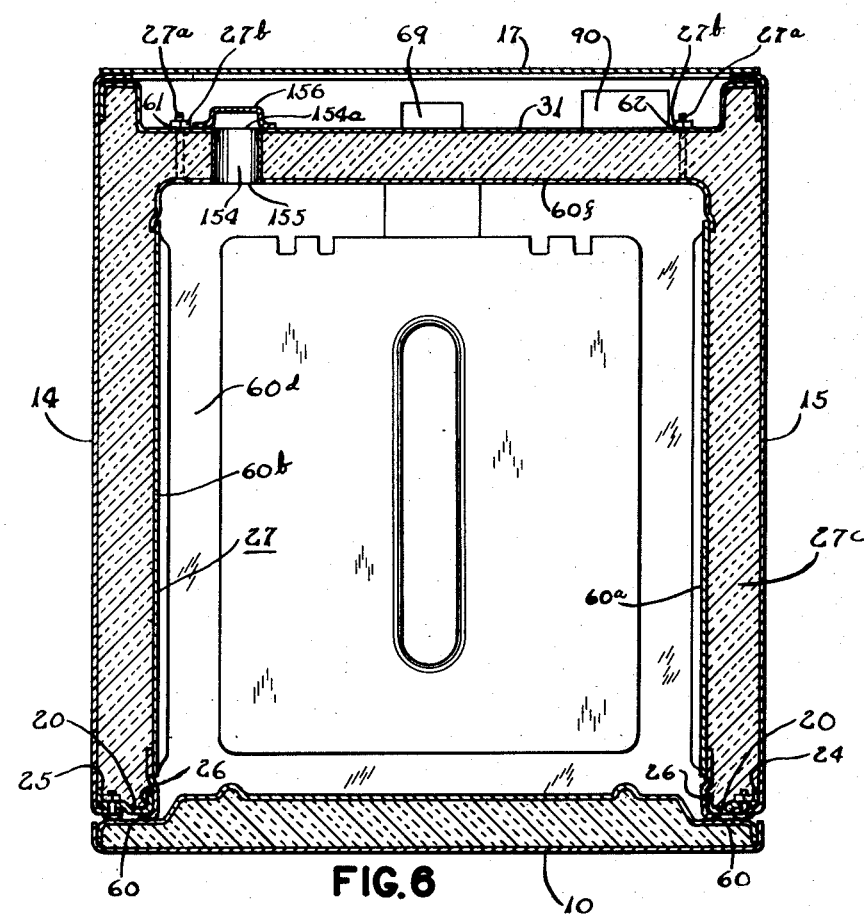
Fig. 6 is a horizontal cross-section taken along the line 6—6 of Fig. 3.

Some of the outer parts of the range, shown in Figs. 1, 2 and 4, include, a front oven door 10, front switch cover panel 11, front lower panel 12, base 13, side panels 14 and 15, top panel 16, and rear cover 17. These parts are, generally, the last to be assembled on the range.

The box-like frame includes a front member 20, a top trough-like member 21, and lower channels 22 and 23. The front member 20 is provided with vertical rearwardly directed flanges 24 and 25 and with an internal rearwardly directed flange 26, and which is adapted to receive the oven liner 27. The front member 20 also has a top rearwardly directed flange 28. This flange 28 has a central indentation 29, which provides a recess to permit the insertion of the user's fingers to pull out the drip pan 30. The bottom channels 22 and 23 are welded at their front ends to the front member 20, and at their rear ends to the rear member 31. The trough-like top member 21 has its rear edges 33 and 34 extended into the rearward channels 35 and 36 of the member 31, and has its forward edge 37 welded under the top flange 28 of the front member 20. The trough-like member 21 also has a bottom 32 and side walls 40 and 41, the walls being provided with top flanges 42 and 43. The side walls 40 and 41 are provided with forward L-shaped extensions 44 and 45. The bottom 32 has upwardly directed rear flange 32a.

The front switch cage 46 is welded at the front portion of the trough-like member 21 by means of the flanges 47 and 48, which are welded to the interior of the walls 41 and 40 respectively. The cage 46 is in the form of a forwardly directed channel having top flange 49 and lower flange 50.

The control switches are mounted on the rear of the switch bar 51, with their control stems 52 extending through the openings 52a. The wires are attached to the control switches, and then the switch bar 51 is bolted to the front portions of the flanges 44 and 45 by means of the bolts 53.

The oven liner is a box-like structure 27 having side walls, 60a, 60b, top wall 60c, bottom wall 60d, rear wall 60f. The walls 60a, 60b, 60c and 60d have outwardly directed flanges 60. The oven liner 27 is inserted through the opening made by the flanges 26, and is held in place by rearwardly extending bolts 27a attached to the rear wall 60f of the liner, the bolts 27a passing through openings 61, 62 in the rear member 31 and being secured by nuts 27b.

The liner 27 has openings 64 and 65, which register with openings 66 and 67 in the rear member 31 for the reception of the terminal blocks and bayonet connections 68 and 69 for the heaters 64a and 65a. The tightening of nuts 27b pulls the liner flanges 60 tightly against the face of front member 20.

After, or before, the oven liner 27 has been assembled in the box-like frame, it may be surrounded with insulation 27c. Any type of blanket insulation may be used to wrap around the liner.

Figure 33:
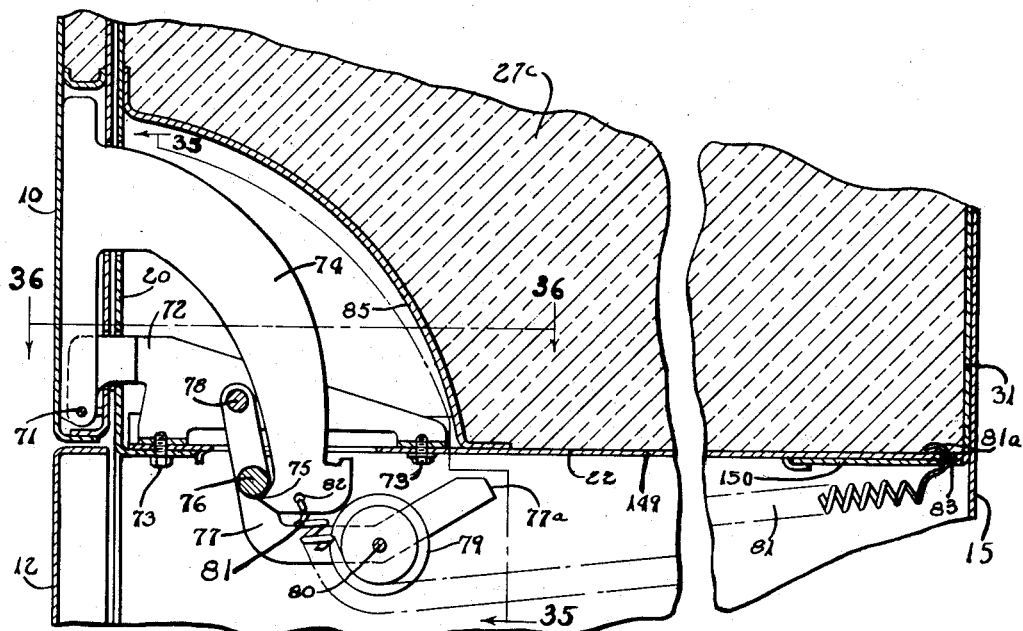
Fig. 33 is a vertical cross-sectional view showing the door counterbalancing means, and taken along the line 33—33 of Fig. 35.
Figure 34:
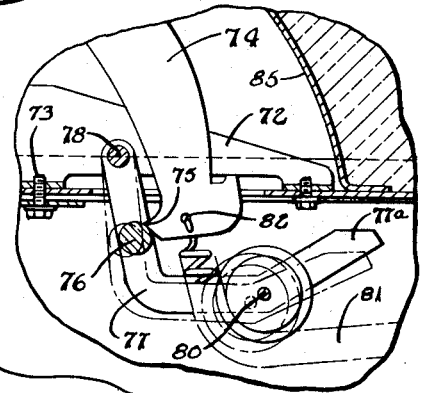
Fig. 34 is a view of a portion of Fig. 33 showing the parts in a different position.
Figure 35:
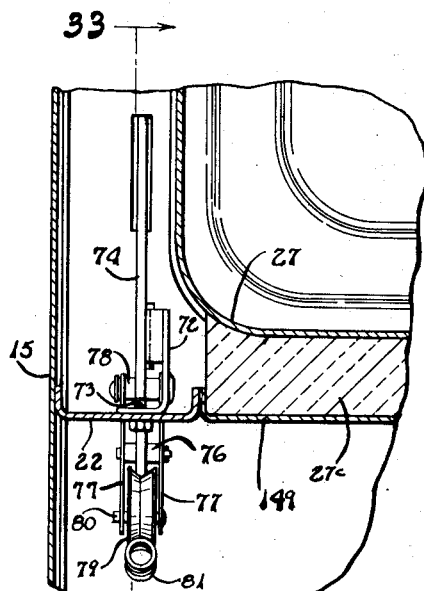
Fig. 35 is a vertical cross-sectional view taken along the line 35—35 of Fig. 33.
Figure 36:
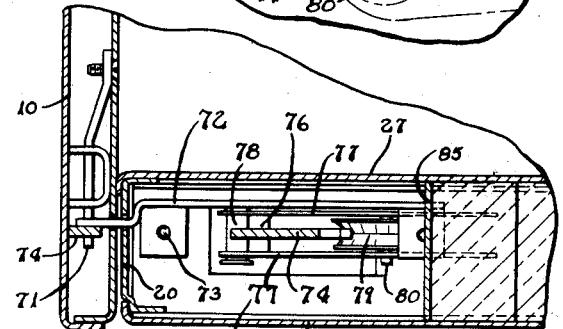
Fig. 36 is a horizontal cross-sectional view taken along the line 36—36 of Fig. 33.

If desired, the door 10 may be assembled on the box-like frame. The door may be of the character disclosed in the patent to F. H. McCormick No. 2,378,421, granted June 19, 1945. The counterbalancing structure, however, preferably is different, and is more particularly shown in Figs. 33 through 36 and described and claimed, per se, in my copending application S. N. 616,361. The door 10 may have its pin 71, corresponding to pins 40 or 115 of the McCormick patent, held by a bracket 72, which is bolted by bolts 73 to the channels 22 and 23. The arm 74 corresponds to the arms 50 of the McCormick patent; but its end is shaped differently, being provided with a forwardly directed wedge 75, which rides over a roller or pin 76 carried between the levers 77, which are fulcrumed on the pin 78 carried by the bracket 72. Between the arms 77 there is a pulley 79, which turns on the shaft 80 carried by the arms 77. A spring 81 is hooked into the opening 82 at the end of the arm 74, and the other end of the spring is secured at 83 by a hook 81a, or any other suitable fastening means. The tension of the spring 81 acting on the pulley 79 causes the pin 76 to be urged against the wedge 75. This action holds the door fully closed, as shown in Fig. 33, or partially open, for broiling purposes, as shown in Fig. 34. The position of the parts, as the door snaps from partly open to fully closed positions is shown by the dotted lines in Fig. 34. When the door is fully opened, the spring 81 exerts a counterbalancing action, as it rides over the pulley 77. At this time, the ends 77a, of the arms 77, rest against the channels 22. If desired, an apron or guard 85 may be provided to hold the insulation away from the counterbalancing means, and may be secured to the front member 20 and channel 22.

Figure 30:
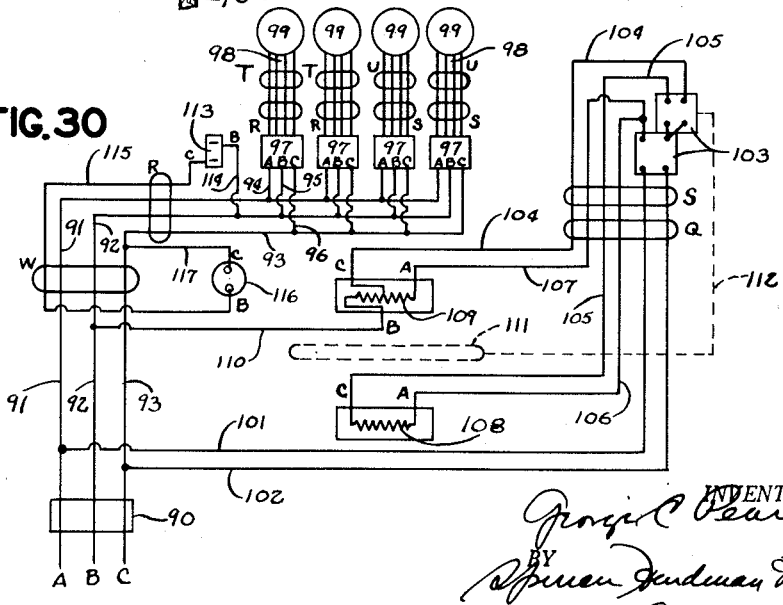
Fig. 30 is a wiring diagram for the range.

After the door and insulation have been placed on the partially assembled range, wiring may be assembled thereon. Preferably the wiring is made of previously fabricated cables as shown in Fig. 29; although individual wires may be used, as indicated in Figs. 11 and 30. Referring more particularly to Figs. 11, 29 and 30, Figs. 11 and 30 may be regarded as wiring diagrams of the cable structure shown in Fig. 29. A terminal block 90 may be placed on the back of the range, to which the power line connector 90a A, B, C may be secured. The terminal block 90 may be connected with the various parts of the range as follows: Wires 91, 92 and 93, which are connected to block 90, pass through the opening W, in flange 35, and continue on the outside of flange 41, of trough-like structure 21, to the opening R from whence they have branches 94, 95 and 96, connected to the switches 97, which are mounted on the back of switch bar 51. The wires 91, 92 and 93 and branches 94, 95 and 96 pass along the inside of trough 50 after entering through the opening R to reach the switches 97. The outgoing terminals of the switches 97 are connected by wires 98 to the top heater units 99. Before reaching the top units 99, the wires 98 pass through the openings R or S to the outside of the trough-like structure 21 and thence back into the trough, through the openings T or U, from whence they may be connected to the top units 99, after the range top 16 has been placed on the structure. The top units 99 may be of the character disclosed in the patent to F. H. McCormick, No. 2,320,041, granted May 25, 1943.

Another set of wires 101 and 102 are connected to wires 91 and 93 as shown in Fig. 30, or to their terminals at block 90 as shown in Fig. 11, pass through openings Q and S to the thermostatic switch 103, which may be of a character disclosed in the patent to Millard E. Fry, No. 2,388,839, granted November 13, 1945, from whence wires 104, 105, 106 and 107 are connected to the lower and upper oven heaters 108 and 109 to provide the circuit disclosed in the said patent to Fry. The oven heaters may be of the general character disclosed in the patent to F. H. McCormick, 2,314,592, granted March 23, 1943. One end of the heater 109 is connected by the wire 110 with the neutral 92, leading to the neutral terminal B as shown in Figs. 29 and 30, or the wire 110 may extend directly to the terminal block 90, as shown in Fig. 11. A thermostatic bulb 111 is placed in the oven liner and is connected by the tube 112 with the thermostatic switch 103. If desired, an appliance plug 113, may be mounted on the switch panel 11. A wire 114 may connect one terminal of the plug 113 with the wire 92. The other terminal of plug 113 may be connected by the wire 115 to the fuse 116 and thence by wire 117 to the wire 93 as shown in Figs. 29 and 30 or directly to the block 90 as shown in Fig. 11.

From the foregoing it is evident that the above wiring connections may be made before any of the side panels of the range are attached, and, with the exception of the top units 99, all the wiring connections can be made before the top 16 is in place.

In the modification shown in Fig. 31, the wires for the top units pass through openings Z in flange 49, instead of through openings R or S and lead to the top units 99a of the top 16a. Otherwise the wiring may be the same as previously disclosed with regard to Figs. 11, 29 and 30.

After the range has been assembled as thus far disclosed, the side panels 14 and 15 may be attached. This is accomplished by bolting the flange 121 of the panels 14 and 15 into the bolt holes 122 formed on the face of the front member 20. Also, the front switch panel 11 may be secured by screws 123, which may pass through openings 123a in the panel 11 directly behind the switch knobs 124 and 125. The screws 123 engage the switch bar 51 at threaded holes 123b. It is understood that the switch knobs 124 and 125 are of the bayonet type, and may be pulled away from their stems in order to permit access to screws 123 and to allow the switch panel 11 to be removed or assembled on a range.

The lower front panel 12 is mounted in the range by resting it on the upwardly directed spring clips 127 (Fig. 3) which may be carried by the side panels 14 and 15, or any other part of the range. The lower flange 128 of the panel 12 is provided with openings which engage the downwardly directed spring clips 129. The springs 129 may also be carried by the panels 14 and 15. It is understood that the upper and lower flanges of the panel 12 are provided with openings or detents for the reception of cooperating portions of the clips 127 and 129.

The base 13 has upper flanges 130 and 131 which may be bolted at 136a to the lower flanges 136 and 137 of the side of the panels 14 and 15.

The back 17 may be secured by screws 130a. The back flanges 131a and 132 of the base 13 may be secured to vertical plates 133 and 134 by screws 135. The upper ends of the plates 133 and 134 previously may have been secured to the flanges 35 and 36 of the back 31.

Figure 3:
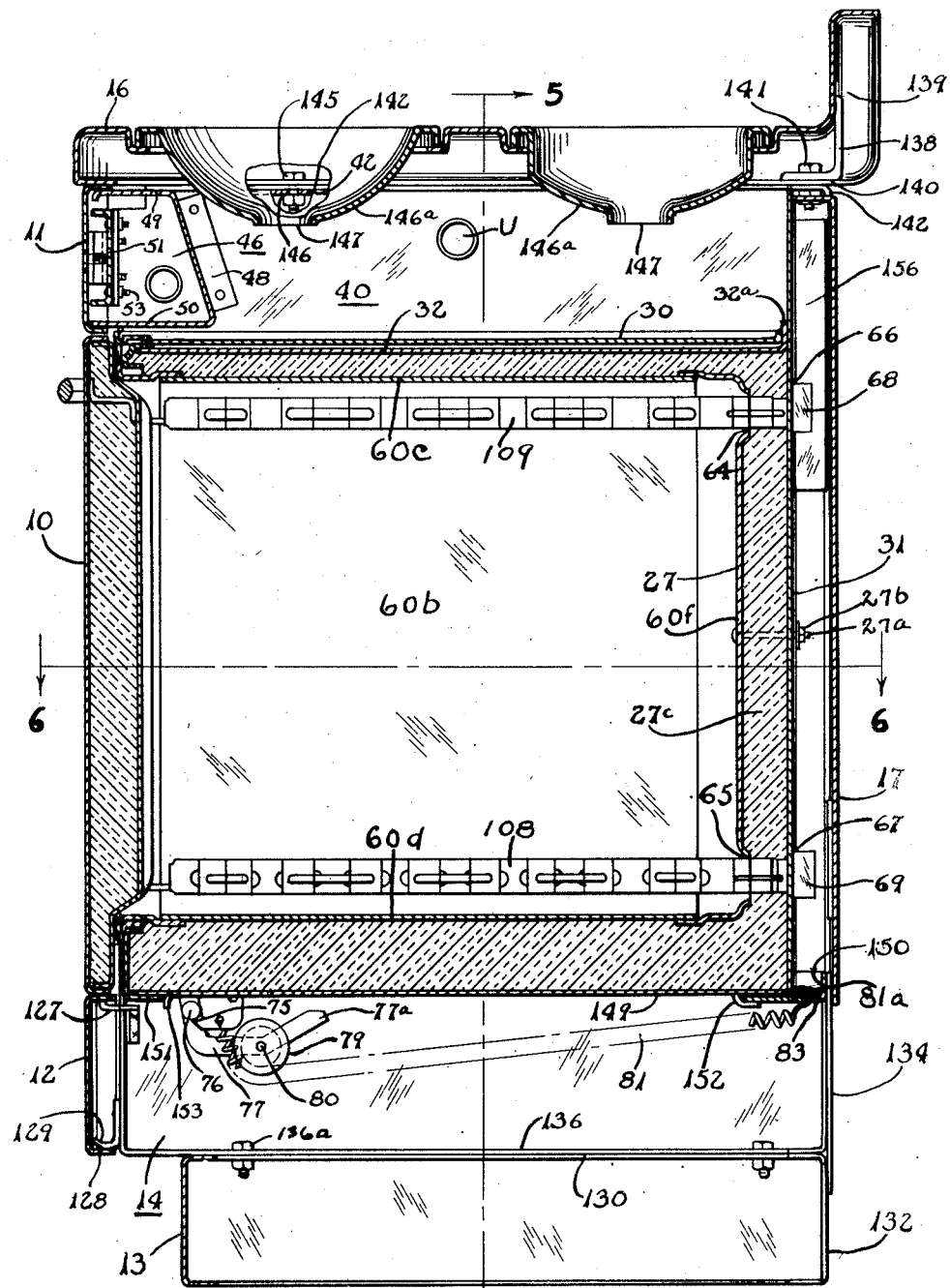
Fig. 3 is a vertical cross-section taken along the line 3—3 of Fig. 1.

The top 16 is secured at the rear to the range by means of brackets 138, which are welded to the back splasher flange 139, and which have forwardly directed flanges 140 (Fig. 3). Bolts 141 pass through flanges 140 of brackets 138, top flanges 142 of side panels 14 and 15 into threaded holes 143 in flanges 42 and 43 of member 21. The holes 143 may be reinforced by nuts (not shown) welded to the underside of flanges 42 and 43.

The top 16 is secured near the front of the range by bolts 145 which pass through top flanges 142 of the side panels 14 and 15 and engage nuts welded under the holes 146 to the flanges 42 and 43. The bolts 145 and 141 may be manipulated before mounting the top units 99 and the drip shields 145a on the top 16.

The drip pan 30 rests on bottom 32 of the trough 21. It catches any material spilled on the heating units, which then falls through the opening 147 of the drip shields 146. The drip pan 30 is provided with an indentation 148 (Fig. 32) in which the user's fingers may be inserted to remove the pan, after the door has been opened.

An insulation supporting plate 149 may be placed between the flange 150 and the lower flange 151 (Fig. 3) of the front member 20. The flange 150 may be welded to the member 31. The plate 149 is provided with cut-away ears 152 and 153 to aid in holding the plate 149 in place.

A vent from the oven is provided. This comprises a cylindrical fitting 154 secured to the rear member 31 at the opening 154a. An opening 155 in the oven liner telescopes into the fitting 154. A channel shield 156 is placed over the rear end of the fitting 154 and extends to an opening 157. The vapors released in the oven may flow through the fitting 154, channel shield 156 and opening 157 into the space inside the trough 21. From thence the vapors may dissipate in diluted form through the cooking top units into the surrounding atmosphere.

The rear cover 17 may be attached by means of screws 130a after all of the wiring has been assembled on the range.

While the form of embodiment of the invention as herein disclosed, constitutes a preferred form, it is to be understood that other forms might be adopted, as may come within the scope of the claims which follow.

What is claimed is as follows:

1. In a device of the character described, in combination, a skeleton box-like frame including centrally open front and side sections, a U-shaped back section, a trough-like top section, and a forwardly open U-shaped switch cage in front of said top section, an oven liner in said frame, a cooking top over said top section and switch cage, top electric heaters supported by said cooking top, an oven electric heater in said oven, switches in said cage, power lines passing outwardly through an opening in said U-shaped back section, thence along the outside said trough-like top section, thence through an opening into said switch cage, and being connected to said switches, connector lines passing from one of said switches through said openings to said oven electric heater, and connector lines passing from other of said switches to said top electric heaters through openings in the top of said switch cage.

2. In a device of the character described, in combination, a skeleton box-like frame including centrally open front and side sections, a U-shaped back section, a trough-like top section, and a forwardly open U-shaped switch cage in front of said top section, a switch bar in front of said switch cage, switches in the rear of said bar with stems extending forwardly through said switch bar, a front switch panel in front of said bar with openings through which said stems extend, and removable handles in front of said switch panel and secured to said stems.

3. In a device of the character described, in combination, a skeleton box-like frame including centrally open front and side sections, a U-shaped back section, a trough-like top section, and a forwardly open U-shaped switch cage in front of said top section, an oven in said frame, an oven door in front of said frame, side panels secured to and supporting said frame, and a door counterbalance below said frame and inside the lower portion of one of said panels.

GEORGE C. PEARCE.

REFERENCES CITED

The following references are of record in the file of this patent:

UNITED STATES PATENTS

| Number | Name | Date |
| --- | --- | --- |
| D. 116,954 | Heym | Oct. 3, 1939 |
| 2,019,045 | Chafee | Oct. 29, 1935 |
| 2,097,977 | Hofferbert | Nov. 2, 1937 |
| 2,161,537 | Stockstrom | June 6, 1939 |
| 2,291,737 | Lockwood | Aug. 4, 1942 |
| 2,375,242 | Lockwood et al. | May 8, 1945 |
| 2,414,162 | Morton | Jan. 14, 1947 |
| 2,414,163 | Barnsteiner et al. | Jan. 14, 1947 |
| 2,418,152 | Avery | Apr. 1, 1947 |

FOREIGN PATENTS

| Number | Country | Date |
| --- | --- | --- |
| 520,256 | Great Britain | Apr. 18, 1940 |